United States Patent
Kramer et al.

(10) Patent No.: US 6,174,008 B1
(45) Date of Patent: Jan. 16, 2001

(54) BUMPER ARRANGEMENT

(75) Inventors: Johann Kramer, Leonberg; Bernd Schroder, Esslingen; Martin Tebbe, Tuebingen, all of (DE)

(73) Assignee: DaimlerChrysler AG (DE)

( * ) Notice: Under 35 U.S.C. 154(b), the term of this patent shall be extended for 0 days.

(21) Appl. No.: 09/417,938

(22) Filed: Oct. 13, 1999

(30) Foreign Application Priority Data

Oct. 14, 1998 (DE) .............................................. 198 47 385

(51) Int. Cl.⁷ .................................................. B60R 19/38
(52) U.S. Cl. ........................ 293/118; 293/119; 293/132; 293/135
(58) Field of Search .................... 293/118, 119, 293/135, 132

(56) References Cited

U.S. PATENT DOCUMENTS

| | | | |
|---|---|---|---|
| 1,496,112 | * 6/1924 | Banschbach | 293/135 |
| 1,642,233 | 9/1927 | Elliott . | |
| 1,664,342 | * 3/1928 | April | 293/119 |
| 2,048,945 | * 7/1936 | Pascheka | 293/119 |
| 2,628,118 | * 2/1953 | Gunnels | 293/119 |
| 2,843,224 | * 7/1958 | Landman et al. | 293/132 |
| 2,959,251 | * 11/1960 | Landman et al. | 293/132 |
| 3,226,146 | * 12/1965 | Behr | 293/132 |
| 3,346,292 | * 10/1967 | Lundman | 293/118 |
| 3,355,208 | * 11/1967 | Brock | 293/118 |
| 3,788,626 | * 1/1974 | Isaacson | 293/135 |
| 3,829,142 | * 8/1974 | Bommarito | 293/135 |
| 3,834,483 | * 9/1974 | Palmer | 293/118 |
| 4,177,882 | * 12/1979 | Dowell et al. | 293/132 |
| 4,461,503 | * 7/1984 | Melby | 293/118 |
| 4,518,183 | * 5/1985 | Lee | 293/118 |
| 5,370,429 | * 12/1994 | Reuber et al. | 293/119 |
| 5,941,582 | * 8/1999 | Tan | 293/135 |
| 6,050,624 | * 4/2000 | Kim | 293/135 |

FOREIGN PATENT DOCUMENTS

| | | |
|---|---|---|
| 38 08 813 A1 | 3/1988 | (DE) . |
| 41 13 031 A1 | 4/1991 | (DE) . |
| 44 14 432 A1 | 4/1994 | (DE) . |
| 44 26 090 C2 | 7/1994 | (DE) . |
| 440196 | * 2/1912 | (FR) ....................................... 293/119 |
| 1107032 | * 7/1955 | (FR) ....................................... 293/119 |
| 07144587A | 6/1995 | (JP) . |

* cited by examiner

Primary Examiner—Joseph D. Pape
Assistant Examiner—Kiran Patel
(74) Attorney, Agent, or Firm—Lawrence J. Shurupoff

(57) ABSTRACT bumper arrangement for a motor vehicle includes a bumper mounted in such a way that it can be moved between a rest position and an operating position. A spring acts on the bumper and is prestressed in the rest position. A locking device holds the bumper in the rest and/or operating position. A control unit actuates the locking device as a function of signals from an accident detection sensor system. When the locking device is unlocked, the spring moves the bumper abruptly into the operating position in which the bumper absorbs impact loads resulting from relative velocities up to a predetermined limit in a substantially elastic manner.

9 Claims, 1 Drawing Sheet

BUMPER ARRANGEMENT

The invention relates to a bumper arrangement for a motor vehicle with a bumper which is mounted in such a way that it can be moved between a rest position and an operating position, a spring energy store which acts on the bumper and is prestressed in the rest position of the bumper, a locking device which holds the bumper in the rest and/or operating position, a control unit which actuates the locking device as a function of signals from an accident-cetection sensor system, and means for returning the bumper from the operating position to the rest position, the spring energy store being designed in such a way that, when the locking device is unlocked, it moves the bumper abruptly into an operating position, in which the bumper absorbs in a purely elastic manner impact loads resulting from relative velocities of up to 8.1 km/h between the motor vehicle and an obstacle German Offenlegungsschrift DR 41 13 031 A1 has disclosed a bumper arrangement of the generic type with a resiliently mounted bumper. The bumper arrangement has a drive device which moves the bumper from a rest position into an operating position, and a control device which activates the drive device in a manner dependent on a dangerous situation. The drive device comprises a hydraulic damping device with a piston which can be moved in a cylinder, is firmly connected to the bumper and can be moved together with the latter into the rest position by means of a hydraulic pump. The damping device is capable of absorbing impact loads resulting from speeds of 15 km/h without damage. Extension times of less than one second are achieved, in particular, by means of a spring energy store in the form of an additional extension spring with an assisting action which is arranged in the hydraulic cylinder.

DE 38 08 813 A1 discloses an impact device for commercial vehicles, in which a bumper can be extended forwards from the vehicle and, in conjunction with an energy-absorbing structure, has an energy-absorbing effect in this position. The extension process can be performed either explosively by converting potential energy stored in a system into kinetic energy or by means of conventional thrust mechanisms, which are activated in an appropriate manner before an impact. In this case, the thrust mechanisms are activated by signals from a measurement and distance sensor.

U.S. Pat. No. 1,642,233 has disclosed a bumper which can be pushed forwards by a compression spring when required to prevent pedestrians from getting under the front wheels of the vehicle.

In another known system (JP 07 144 587 A), a bumper arrangement of a motor vehicle is extended forwards into an elastically flexible state in order thereby to achieve greater elastic flexibility in the event of corresponding impact loads.

German Patent DE 44 26 090 C2 has disclosed a safety device for a motor vehicle which has a bumper bar fitted with preloading elements that can be triggered pyrotechnically. The bumper bar can be extended with the aid of the preloading elements into an operating position in which it offers a higher energy absorption capacity. It can be brought back into its original position after being triggered. It is triggered by means of an impact sensor system comprising proximity sensors such as infra-red and/or magnetic-field sensors.

German Offenlegungsschrift DE 44 14 432 A1 has disclosed an impact protection unit for a motor vehicle, this unit having a body part which can be extended on a linkage and, if the vehicle is involved in a collision, is moved into an operating position hydraulically or by means of an airbag together with the body parts, the airbag and/or the holding mechanism represents an enlarged, plastically deformable crumple zone for the motor vehicle.

SUMMARY OF THE INVENTION

It is the object of the invention to provide a bumper arrangement of the type stated at the outset in which the bumper can be returned to its rest position by means which are as simple as possible while providing a high energy absorption capacity and rapid extension of the bumper into its operating position.

This object is achieved by virtue of the fact that the means for returning the bumper have a shape-memory spring arrangement which can be converted by an activation unit to a special configuration, in which the shape-memory spring arrangement forces the bumper into its rest position. In the operating position of the bumper, the spring energy store can assume a position in which it is completely relaxed and thus has its maximum energy absorption capacity. While retaining otherwise customary spring characteristics of known bumper arrangements, the energy absorption capacity of the spring energy store is significantly increased thanks to a considerable increase of the spring displacement. When needed, it is available without any significant delay by rapid extension In the rest position, the energy absorption capacity of the spring energy store is reduced in favour of space-saving accommodation. The shape-memory spring arrangement can preferably be embodied in such a way that, in the special configuration, it has a reduced length compared with a standard configuration and, in this special configuration, pulls the bumper into a rest position, in which it likewise has a reduced extent, and, in the standard configuration, acts in parallel with the bumper. This means that, once the spring energy store has reached its prestressed state, and the bumper has been locked in its rest position, the shape-memory spring arrangement can be transferred to its standard configuration, in which it likewise prestressed.

As a refinement of the invention, the shape-memory spring arrangement can be converted to the special configuration as a function of temperature, and the activation unit is designed as an energy source that can be actuated by the control unit. Here, the shape-memory spring arrangement preferably assumes its standard configuration at customary ambient temperatures, while it assumes its special configuration at an activation temperature that deviates significantly from a customary ambient temperature. The activation temperature is introduced by resistance heating.

As a further refinement of the invention, the spring energy store and the shape-memory spring arrangement are arranged to form a coaxial spring assembly. Particularly when it takes the form of a helical spring assembly, the spring assembly represents a particularly space-saving possibility for arranging the spring energy store and the shape-memory spring arrangement. Force is transmitted between the spring assembly, on the one hand, and the bumper, on the other hand, in a precisely defined manner along the axis of the spring assembly.

BRIEF DESCRIPTION OF THE DRAWING

Further advantages and features of the invention will emerge from the claims. A preferred embodiment example of the invention is described and explained with reference to the drawings below, in which

DETAILED DESCRIPTION

Figure 1:
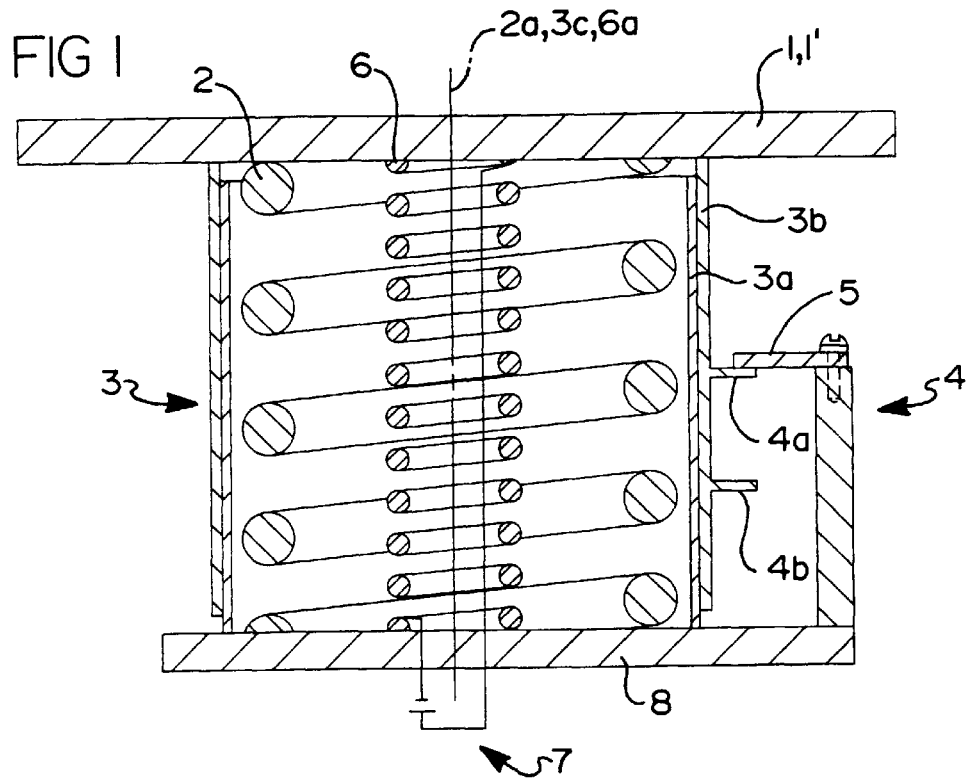
FIG. 1 shows a sectional side view of a bumper arrangement according to the invention for a motor vehicle, the bumper being shown in its rest position.
Figure 2:
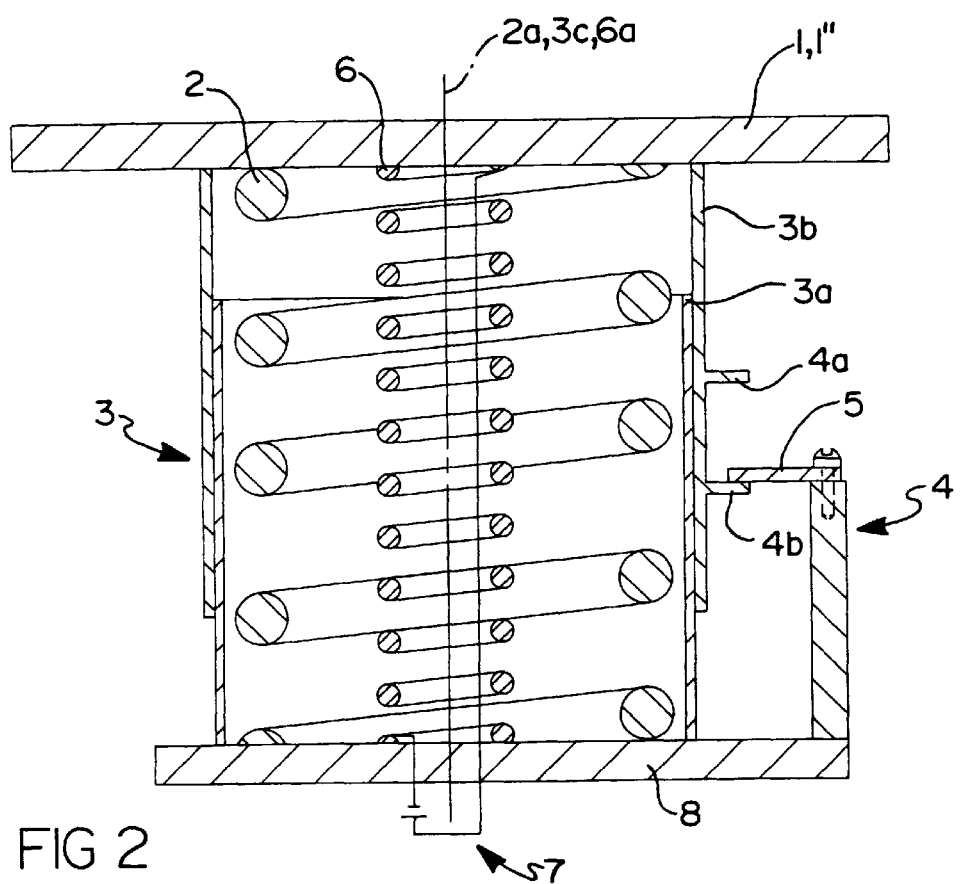
FIG. 2 shows a bumper arrangement shown in FIG. 2, the bumper being shown in its extended operating position.

FIGS. 1 and 2 show a bumper arrangement according to the invention for a motor vehicle, with a bumper 1, which can be moved backwards and forwards between a rest position 1' in accordance with FIG. 1 and an operating position 1" in accordance with FIG. 2. The bumper 1 is arranged by means of a spring energy store 2, in particular a steel spring with spring properties known per se, on a body element 8, on which it is supported via the spring energy store 2. The body element 8 is preferably a deformation element which is detachably connected to the supporting structure of the body and has its own energy absorption capacity based on plastic deformability. Arranged on the body element 8 is an inner tube 3a of a cylindrical axial guide 3, which is surrounded by an outer tube 3b connected to the bumper 1 and forming another component of the axial guide 3. The inner tube 3a is preferably designed in such a way that the spring energy store 2 designed as a helical spring can be inserted in it with slight play. The axis 2a of the spring energy store 2 thus coincides approximately with the center line 3c of the axial guide 3. In a modified embodiment example, the axial guide can be implemented in any other way or even omitted The bumper arrangement furthermore comprises a locking device 4, which essentially comprises two stops 4a, 4b connected to the bumper 1 by the outer tube 3b and a locking bar 5, which is fixed to the body and serves as a latch arrangement. The locking bar 5 can be unlocked by a control unit as a function of signals from an accident-detection sensor system (not shown) For this purpose, it can be actuated in a rotary or linear manner by means of a corresponding drive of the control unit. The mobility of the locking bar is not shown in the drawings. For this purpose, the accident-detection sensor system preferably comprises proximity and/or deceleration sensors, which can detect a possible collision with an obstacle at an early stage and transmit corresponding signals to the control unit.

A shape-memory spring arrangement 6, likewise designed as a helical spring, together with an associated activation unit 7 in the form of an electrical power supply is Furthermore provided The shape-memory spring arrangement 6 serves as a means of returning the bumper 1 to the rest position 1' from the operating position 1". In addition, as described below, it complements the function of the spring energy store since, in its standard configuration, it acts in parallel with the helical spring.

The shape-memory spring arrangement 6 forming a complementary spring energy store is firmly connected to the bumper, on the one hand, and to the body element 8, on the other hand. The shape-memory spring arrangement 6 essentially comprises a spring which is manufactured from a shape-memory wire and is arranged coaxially with the spring energy store 2, with the result that its axis 6a coincides with the axis 2a of the spring-energy store 2 and the shape-memory spring arrangement 6 forms a spring assembly together with the spring energy store 2. The shape-memory spring arrangement 6 has two configurations, a standard configuration at a normal ambient temperature and a special configuration at an activation temperature higher than the normal ambient temperature. In the special configuration, the length of the shape-memory spring arrangement 6 in the unloaded state is significantly smaller than the length achieved in the rest position 1' of the bumper 1 in accordance with FIG. 1 In the standard configuration, the length of the shape-memory spring arrangement 6 in the unloaded state corresponds approximately to that of the spring-energy store 2 in the unloaded state in accordance with FIG. 2.

The shape-memory spring arrangement 6 can be converted to the special configuration as a function of temperature by being heated by the application of an electric voltage. The shape-memory spring arrangement itself here serves as an electric resistance heater. In a modified embodiment example of the invention, the shape-memory spring arrangement can also be heated from the outside by a separate active heat transfer medium.

The bumper 1 can be returned from the operating position 1" shown in FIG. 2 as follows. According to FIG. 2, the shape memory spring arrangement 6 is in its standard configuration at a customary ambient temperature and is to a large extent relaxed. By activation, i.e. heating to a particular increased activation temperature by applying the electric voltage, the shape-memory spring arrangement 6 is converted to its special configuration. However, since the shape-memory spring arrangement 6 is clamped between the bumper 1 and the body element 8 and these are held apart by the spring energy store 2, an internal tensile stress initially builds up in the shape-memory spring arrangement 6. Once this tensile stress has reached the level of the prestress of the spring energy store 2, the shape-memory spring arrangement contracts, the spring energy store 2 being simultaneously compressed and the bumper 1 being moved into its rest position 1'.

Once the bumper 1 has assumed its rest position 1' in accordance with FIG. 1, the locking bar 5 is locked against stop 4a, thus locking the bumper arrangement in this position. The power supply (activation unit) 7 can then be switched off, thereby causing the shape-memory spring arrangement to lose its tensile stress once a normal ambient temperature has been re-established. Since a change in geometry is prevented by the interlocking engagement, only the stress conditions within the shape-memory spring arrangement change, namely in that the tensile stress is relieved. Once the locking bar 5 is unlocked again, the spring energy store 2 car extend the bumper 1 into its operating position 1".

The spring energy store 2 is used to temporarily store kinetic energy introduced abruptly into the body from the outside via the bumper 1. It has at least approximately linear elastic deformation behaviour and allows reversible absorption of energy. However, the spring energy store 2 usually has a relatively short deformation path. This being necessitated by requirements imposed on the configuration of the vehicle as a whole. Limited length and width dimensions of the vehicle and design criteria permit only a limited spring displacement of the spring energy store 2.

To protect the body structure as far as possible from damage, especially taking into consideration North American standards, in which substantial freedom from damage at impact loads of up to 8.1 km/h is required, as high as possible an energy absorption capacity on the part of the bumper arrangement is desirable, but this conflicts with the requirements for a small spring displacement.

According to the invention, provision is made for the spring energy store 2 to be positioned under a certain degree of prestress in the rest position 1' of the bumper. To maintain this position, the locking bar 5 engages on the stop 4a and blocks movement of the outer tube 3b and hence at the bumper 1. The spring energy store 2 is thereby held in its stressed position between the bumper 1 and the body element 8. When the locking bar 5 is unlocked, the stop 4a is released and the spring energy store 2 can relax in a single abrupt movement, the bumper 1 being displaced along the axial guide 3 and transferred to its operating position 1". In this operating position, the locking bar 5 is unlocked, with the result that It engages on the stop 4b and blocks further extension of the bumper 1. In a modified embodiment example, it is also possible for the locking bar to reach around the stops 4a and 4b on both sides.

The operating position 1" of the bumper 1 represents what is referred to as a bump position, in which the spring energy store 2 is in a largely relaxed arrangement and therefore has its maximum energy absorption capacity. Starting from the rest position 1', the bumper 1 can be extended by a displacement of preferably about 50 mm in the direction of the axis 3c. This means that it has a spring displacement greater by about 50 mm than the rest position 1'. In the rest position 1' of the bumper 1, the bumper arrangement has approximately the same dimensions as a customary bumper arrangement based on a spring energy store. Thus, the extension in accordance with the invention of the bumper 1 makes it possible to increase the energy absorption capacity of the spring energy store accordingly while maintaining a customary spring constant. This makes it possible to achieve a purely elastic deformation of the spring energy store 2 and to avoid deformation of the body element 8 in the event of collisions with relative impact velocities of up to 8.1 km/h. The spring energy store preferably behaves in a linear elastic manner.

The bumper 1 is extended, in particular, when the accident-detection sensor system indicates a possible collision with an obstacle to the control unit, which thereupon unlocks the locking bar 5 and allows abrupt extension of the bumper 1 driven by the spring energy store 2 and the shape-memory spring arrangement 6. Partricularly suitable parameters for monitoring by the accident-detection sensor system are vehicle deceleration and the distance from and speed of approach of an obstacle. Owing to the simplicity of the shape-memory spring arrangement 6 for returning the bumper 1 and its ability for repeated actuation, the limiting values for triggering such an extension process can be set to a relatively low level.

The proposed arrangement is simple and economical to Produce, has a low weight and requires little space. Together with the deformable body element 8, the bumper arrangement according to the invention forms what is known as a "crash structure" which can absorb the kinetic energy of the vehicle equipped with it in collisions with relative impact velocities of up to about 8 km/h by purely elastic deformation of the extended spring assembly, and can furthermore also absorb the energy resulting from collisions with relative impact velocities of up to 20 Km/h by combined elastic and plastic deformation of the "crash structure". This makes it possible to achieve improved protection for the supporting structure of the body from plastic deformation.

What is claimed is:

1. Bumper arrangement for a motor vehicle comprising
    a bumper which is mounted in such a way that it can be moved between a rest position and an operating position,
    a spring energy store which acts on the bumper and is prestressed in the rest position of the bumper,
    a locking device which holds the bumper in one of the rest and operating positions, and
    means for returning the bumper from the operating position to the rest position,
    the spring energy store being designed in such a way that, when the locking device is unlocked, it moves the bumper abruptly into an operating position, in which the bumper absorbs in a substantially elastic manner impact loads resulting from relative velocities of up to a predetermined value between the motor vehicle and an obstacle, characterized in that the means for returning the bumper have a shape-memory spring arrangement which can be converted by an activation unit to a special configuration, in which the shape-memory spring arrangement forces the bumper into its rest position.

2. Bumper arrangement according to claim 1, characterized in that the shape-memory spring arrangement can be converted to the special configuration as a function of temperature, and in that the activation unit is designed as an energy source that can be actuated by a control unit.

3. Bumper arrangement according to claim 1, characterized in that the bumper is guided between said rest position and said operating position by means of an axial guide.

4. Bumper arrangement according to claim 3, characterized in that the spring assembly is arranged coaxially with the axial guide.

5. Bumper arrangement according to claim 1, characterized in that the locking device is designed as a latch arrangement which can be brought into operative connection with the bumper by interlocking engagement.

6. Bumper arrangement according to claim 1 wherein the predetermined value is on the order of 8 km/h.

7. Bumper arrangement according to claim 2, characterized in that the shape-memory spring arrangement can be converted to the special configuration as a function of temperature, and in that the activation unit is designed as an active heat transfer medium that can be actuated by the control unit.

8. Bumper arrangement according to claim 3, characterized in that the axial guide is cylindrical.

9. Bumper arrangement according to claim 4, characterized in that the axial guide is cylindrical.

* * * * *